United States Patent
Fujiki

(10) Patent No.: US 7,162,556 B2
(45) Date of Patent: Jan. 9, 2007

(54) MATRIX TYPE BUS CONNECTION SYSTEM AND POWER REDUCTION METHOD THEREFOR

(75) Inventor: Yuji Fujiki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 142 days.

(21) Appl. No.: 11/060,296

(22) Filed: Feb. 18, 2005

(65) Prior Publication Data

US 2005/0188137 A1    Aug. 25, 2005

(30) Foreign Application Priority Data

Feb. 20, 2004    (JP)    ............. 2004-044023

(51) Int. Cl.
*G06F 13/14*    (2006.01)

(52) U.S. Cl. ........................ 710/110; 713/300
(58) Field of Classification Search ............. 710/110, 710/240–244
See application file for complete search history.

(56) References Cited

U.S. PATENT DOCUMENTS 5,349,682 A * 9/1994 Rosenberry ............. 718/102
6,912,611 B1 * 6/2005 Kotlowski et al. ....... 710/305
2005/0080933 A1 * 4/2005 Herring .................. 709/249

FOREIGN PATENT DOCUMENTS

JP    8-255127    1/1996
JP    10-143444    5/1998

* cited by examiner

*Primary Examiner*—Rehana Perveen
*Assistant Examiner*—Trisha Vu
(74) *Attorney, Agent, or Firm*—Rabin & Berdo, P.C.

(57) ABSTRACT

A matrix type bus connection system comprising a plurality of master devices and slave devices, wherein data transfer between arbitrary master device and slave device is available, and the power reduction method therefor is disclosed. When a slave device is to be setting to low-power operation state, decoding table contents of relevant master device are altered according to the control signal from a low-power control circuit, first of all, then connection request for the destination device is set from the slave device to be in low-power operation state to the predetermined default slave device. After that, the target slave device to be in low-power operation is set to be in low-power operation state by the low-power control signal from the low-power control circuit.

3 Claims, 3 Drawing Sheets

MATRIX TYPE BUS CONNECTION SYSTEM AND POWER REDUCTION METHOD THEREFOR

BACKGROUND OF THE INVENTION

1. Field of the Invention

This invention relates generally to a matrix type bus connection system that enables simultaneous operation of master devices connected to a plurality of slave devices, and to a power reduction method of the slave devices.

2. Description of the Related Art

FIG. 2 is a block diagram showing a related matrix type bus connection system.

This matrix type bus connection system includes a plurality of master devices $1_i$ (i=1 to m), a plurality of slave devices $2_j$ (j=1 to n), a matrix type bus circuit 10 for connecting master and slave device arbitrarily.

In principle, the matrix type bus circuit includes a plurality of dedicated buses installed for master devices $1_i$ (each bus is referred to as "master bus" or "bus of master device") and a plurality of dedicated buses installed for the slave devices $2_j$ (each bus is referred to as "slave bus" or as "bus of the slave device"), the master bus crosses over the slave bus, and controls connection of these buses at the crossing point in accordance with access requests from master devices.

Each master device $1_i$ has a decoder (DEC) $11_i$ and selector (SEL) $12_i$, provided on each master bus, and each slave device $2_j$ has an arbitration circuit (ARB) $13_j$ and selector $14_j$, provided on each slave bus.

The decoder $11_i$ specifies a connection target slave device $2_j$ by analyzing an address from master device $1_i$, and send an access request to the arbitration circuit $13_j$ of the slave device $2_j$. The arbitration circuit, on the other hand, determines the accessible master device based on the priority of access requests or on the order of the requests from each decoder $11_i$, and controls the selector $12_i$ and the selector $14_j$.

The operation of the matrix type bus connection system will now be described below using the case of accessing from master device $1_1$ to the slave device $2_n$.

The master device $1_1$ issues the target address (addr) of the slave device $2_n$ on the associated master bus. This target address (addr) is read and analyzed by the decoder $11_1$ of the master device $1_1$, and the access request is send from the decoder $11_1$ to an arbitration circuit $13_n$ of the slave device $2_n$.

When the access request is permitted by the arbitration circuit $13_n$ of the slave device $2_n$, the arbitration circuit $13_n$ send the selection signal to the selector $14_n$ for connecting the bus of master device $1_1$, and also send the selection signal to selector $12_1$ of master device $1_1$ for connecting the bus of slave device $2_n$. Thus master device $1_1$ is connected to the slave device $2_j$.

When the connection is made, the master device $1_1$ issues such information as target address (addr), data transfer type (trans), and transfer count information (burst) to the slave device $2_n$, the slave device $2_n$ then sends a reply signal (ready) to the master device $1_1$. Thereafter data transfer is executed according to the data transfer type.

In this way, the matrix type bus circuit 10 connects the bus of the master device $1_i$ to the bus of the slave device $2_j$. Thus the master device $1_i$ can be connected to an arbitrary slave device $2_j$ as long as the target slave device $2_j$ has not yet be connected to other master device $1_i$.

The similar bus connection system is disclosed in Japanese Patent Kokai (Laid-open Application) Nos. 8-255127 and 10-143444.

However, in the above mentioned matrix type bus connection system, the low-power operation control processing, such as halting to supply clock signal to the slave device $2_j$, would result in the absence of a reply signal (ready) from the slave device $2_j$. For this reason, operation of master device is stopped because of the absence of the reply signal from selected slave device $2_j$.

SUMMARY OF THE INVENTION

The object of the present invention is to provide a matrix type bus connection system, which does not stop operation, even if the slave device is in low-power operation state, and also to provide the method for reducing the power of the slave device.

According to one aspect of the present invention, there is provided an improved matrix type bus connection system and power reduction method therefor.

This matrix type bus connection system includes a plurality of master devices for issuing connection request by outputting a target device address to each dedicated master bus; a plurality of slave devices for transferring data to the master device through dedicated slave bus; a low-power control circuit for controlling each slave device in low-power operation state; a plurality of decoders equipped with the plurality of master devices, respectively, such that each said decoder analyzes the address of the connection target slave device issued from the associated master device to specify the connection target slave device, and to output a connection request signal, said decoder also outputs a connection request signal to a predetermined default slave device in accordance to a control signal from the low-power control circuit, when connection request is issued from master device to the slave device in low-power operation state; a plurality of arbitration circuits equipped with the plurality of slave devices, respectively, such that said arbitration circuit controls connections between said master device and said slave device; a first selectors equipped with the plurality of master devices, respectively, such that said selector selects the bus of said slave device to connect the bus of associated master bus according to a first selection signal from the arbitration circuit; and a second selectors equipped with the plurality of slave device, respectively, such that said selector selects the bus of said master device to connect the bus to the associated slave bus according to a second selection signal from the arbitration circuit.

In this matrix type bus connection system, when a decoder receives a connection request from a master device to a slave device, the slave device being in low-power operation state, the decoder sends connection request signal to the predetermined slave device (this device is in normal power state). Accordingly, even if a low-power operation state device is accessed by a master device, the system will no longer fall into non-response state.

The matrix type bus connection system comprises a plurality of master devices and slave devices connected in matrix type, and decoders equipped with each master device. The decoder decodes target address of slave device.

This system comprises a plurality of arbitration circuits equipped with each slave device. The arbitration circuit controls connection between any master device and slave device and data flow transferred therebetween. In this system, when slave device is attempted to be in low-power operation state respectively, data transfer state of each master device is supervised, and if a master device is in process of data transfer to one of the slave device, decoding table contents of the decoder associated with the data transfer must be altered immediately after termination of the data transfer, thereby switches the destination slave device from the target slave device in low-power operation state to the prescribed default slave device.

After all decoding table contents of decoders are altered associated with each master device, slave device to be in low-power operation state will be set to low-power operation state.

These and other object, aspects and advantages of the present invention will become apparent to those skilled in the art from following detailed description of the embodiment in conjunction with the accompanying drawings. It should be noted that the drawings are merely for description, and do not limit the scope of the present invention.

DETAILED DESCRIPTION OF THE INVENTION

Figure 2:
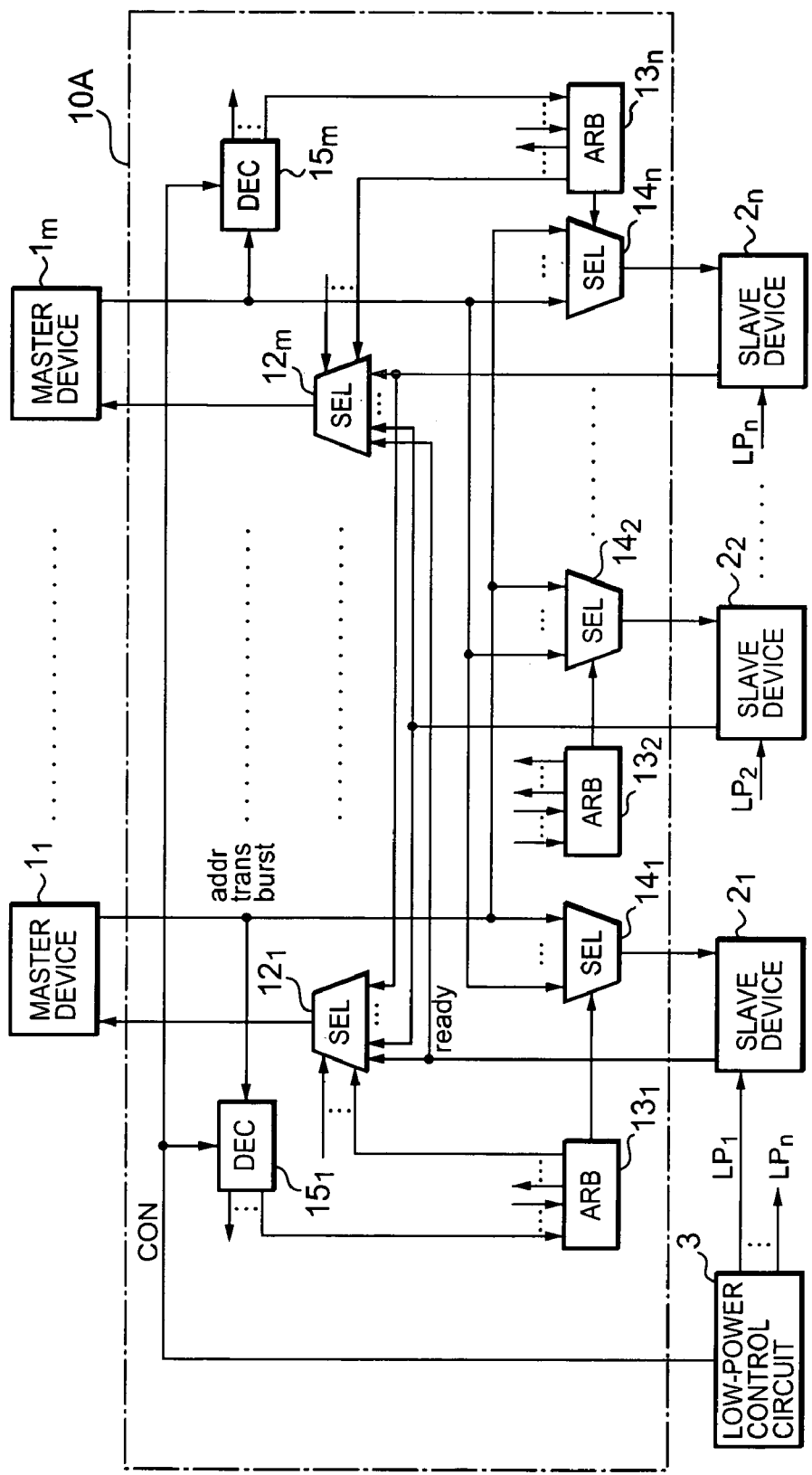
FIG. 2 is a block diagram depicting a matrix type bus connection system according to the first embodiment of the present invention.

FIG. 2 is a block diagram depicting a matrix type bus connection system according to the first embodiment of the present invention.

This matrix type bus connection system includes a plurality of master devices $1_i$ (i=1 to m), a plurality of slave devices $2_j$ (j=1 to n) and matrix type bus circuit 10A, and low-power control circuit 3.

The master device $1_i$ is such a device as, for example, CPU (Central Processing Unit) or DMA (Direct Memory Access) device that can specify target device by issuing address (addr). The slave device $2_j$ is such a device as, for example an input/output device or storage device that can receive an access request from a master device $1_i$ by the address (addr).

The matrix type bus circuit 10A comprises decoders (DEC) $15_i$, selectors (SEL) $12_i$, arbitration circuits (ARB) $13_j$ and selectors $14_j$ equipped with each dedicated slave bus connected to each slave device $2_j$.

The decoder $15_i$ specifies target slave device $2_j$ by decoding address from a master device $1_i$ and issues request for accessing to the associated arbitration circuit $13_j$. The decoder includes decoding table (not shown) for storing data for address analysis and specifies target slave device to be accessed by referring to the decoding table in accordance with the address from the master device $1_i$. The decoding table includes a plurality of prescribed data associated with the operation state (i.e. normal operation state or low-power operation state) of slave device $2_j$ and the contents of the decoding table can be altered by the control signal (CON) from the low-power control circuit 3.

Each arbitration circuit $13_j$ decides accessible master device according to the priority of access request or the order of request, and controls operation of the selector equipped with the master device and that of the selector equipped with the slave device. The selector $12_i$ selects dedicated bus of the slave device $2_j$ in accordance with the select signal from the arbitration circuit $13_j$, and connects the dedicated slave bus to the dedicated master bus. The selector $14_j$ selects dedicated bus of master device $1_i$ according to the selection signal from associated arbitration circuit $13_j$, and connect the bus to the dedicated bus of slave device $2_j$.

The low-power control circuit 3 outputs the control signal (CON) for selecting decoding tables in the decoder $15_i$ in accordance with the operation state of each slave device $2_j$, and issues low-power signal (LPj) to each slave device to be controlled. In this way the low-power control circuit 3 controls each slave device $2_j$ into low-power operation state respectively.

In the decoding table described above, the stored data is such that when the address of the low-power operation state slave device $2_j$ is given, then a particular slave device (i.e. slave device 22), wherein the device is in normal power state, is selected as default slave device. Meanwhile, when an address of slave device $2_j$ in low-power operation state is given, the default slave device is able to output a response signal, showing that the relevant slave device is in low-power operation state, instead of the slave device $2_j$.

Figure 1:
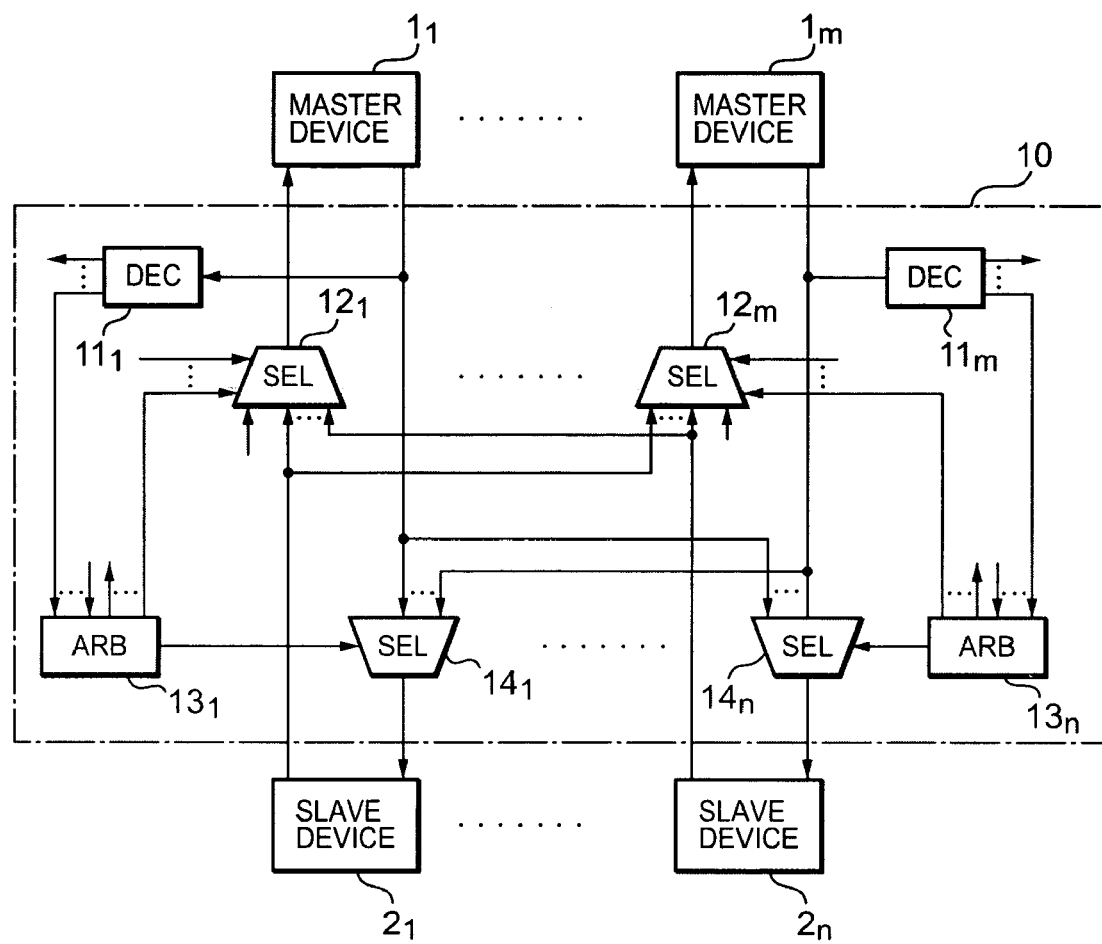
FIG. 1 is a block diagram depicting a related matrix type bus connection system.

In case of accessing from master device $1i$ to slave device $2_n$ in normal power state, the operation is similar to that of related system (described in FIG. 1). More specifically, master device $1_1$ outputs the target address (addr) of slave device $2_n$ on the dedicated master bus, and the address is read and decoded by associated decoder $11_1$. In this case, as the slave device $2_n$ is in normal operation state, the decoder outputs the access request to the arbitration circuit $13_n$ equipped with the slave device $2_n$.

When the access request is accepted by the arbitration circuit of the slave device $2_n$, the arbitration circuit outputs selection signal to the selector $14_n$ for connecting the bus of master device $1_1$, and also output selection signal to the selector $12_1$ for connecting bus of slave device $2_n$, in this way, connection between master device $1_1$ and the slave device $2_n$ is achieved.

After the connection is achieved, master device 1l outputs such information as, for example, target address for slave device $2_n$, data transferring type (trans), number of times of transfer (burst) and so on, according to the transfer protocol. Slave device $2_n$ then returns response signal (ready) to the master device $1_1$, then data transfer is executed according to the transfer type.

Next, for example, slave device $2_1$ is controlled into low-power operation state, the low-power control circuit 3 sends control signal (CON) to each decoder $15_i$ to refer to decoding tables for switching access request from the slave device $2_1$ to the default slave device (i.e. slave device 22), then the low power control circuit 3 sends low-power control signal (LP1) to the slave device $2_1$, and the slave device $2_1$ falls into low-power operation state.

In this state of things, when master device $1_m$ sends connection request to the slave device $2_1$ in low-power operation state, the master device send target address (addr) of the slave device $2_1$ to the dedicated master bus. The address (addr) is then read and decoded by associated decoder $11_m$. In this case, the contents of the decoding table in the decoder $11_m$ are altered to access the default normal state slave device instead of the slave device $2_1$ in low-power operation state, thereafter, access request from the decoder $11_m$ to the arbitration circuit $13_2$ of the slave device $2_2$ will be send. When the access request is accepted by the arbitration circuit $13_2$, the arbitration circuit $13_2$ sends selection signal for connecting the bus of the slave device $2_2$ to the selector $12_m$ of master device $1_m$. In this way, connection between the master device $1_m$ and the slave device $2_2$ is achieved.

After connection is made, master device $1_m$ sends information such as address of slave device $2_1$, data transfer type (trans), number of times of transfer (burst), and so on. Meanwhile, slave device $2_2$, wherein the device receives address (addr) of the slave device, sends response signal meaning that slave device $2_1$ is in low-power operation state, to the master device $1m$ instead of slave device $2_1$. In this way, the master device $1_m$ recognizes that the slave device $2_1$ is in low-power operation state, and processing according to the slave device operation state may be executed.

The low-power operation state slave device will be able to come back in normal state by stopping the low-power signal (LP1) from low-power control circuit 3 to the slave device $2_1$, and by setting the control signal (CON) to the state corresponding to the normal operation state.

As mentioned above, in this matrix type bus connection system of this embodiment, when falling down the slave device 2 in low-power operating state respectively, low-power control circuit 3 switches connection from the low-power operation state slave device 2 to default slave device by altering decoding table contents in each decoder 15. The default slave, when accessed by other slave device address, sends response signal indicating that the slave device is in low-power operation state. In this way, master device is able to continue appropriate job without loss of waiting time for response, even if the slave device is in low-power operation state.

The decoding table of each decoder $15_i$ may be constructed by using rewritable memory, and low-power control circuit 3 may rewrite the memory in accordance with the operation state of each slave device $2_j$. It is also possible to decode the target device address by appropriate software or logic circuit without using decoding table. In this case, the software or logic circuit must be changed by control signal (CON).

Figure 3:
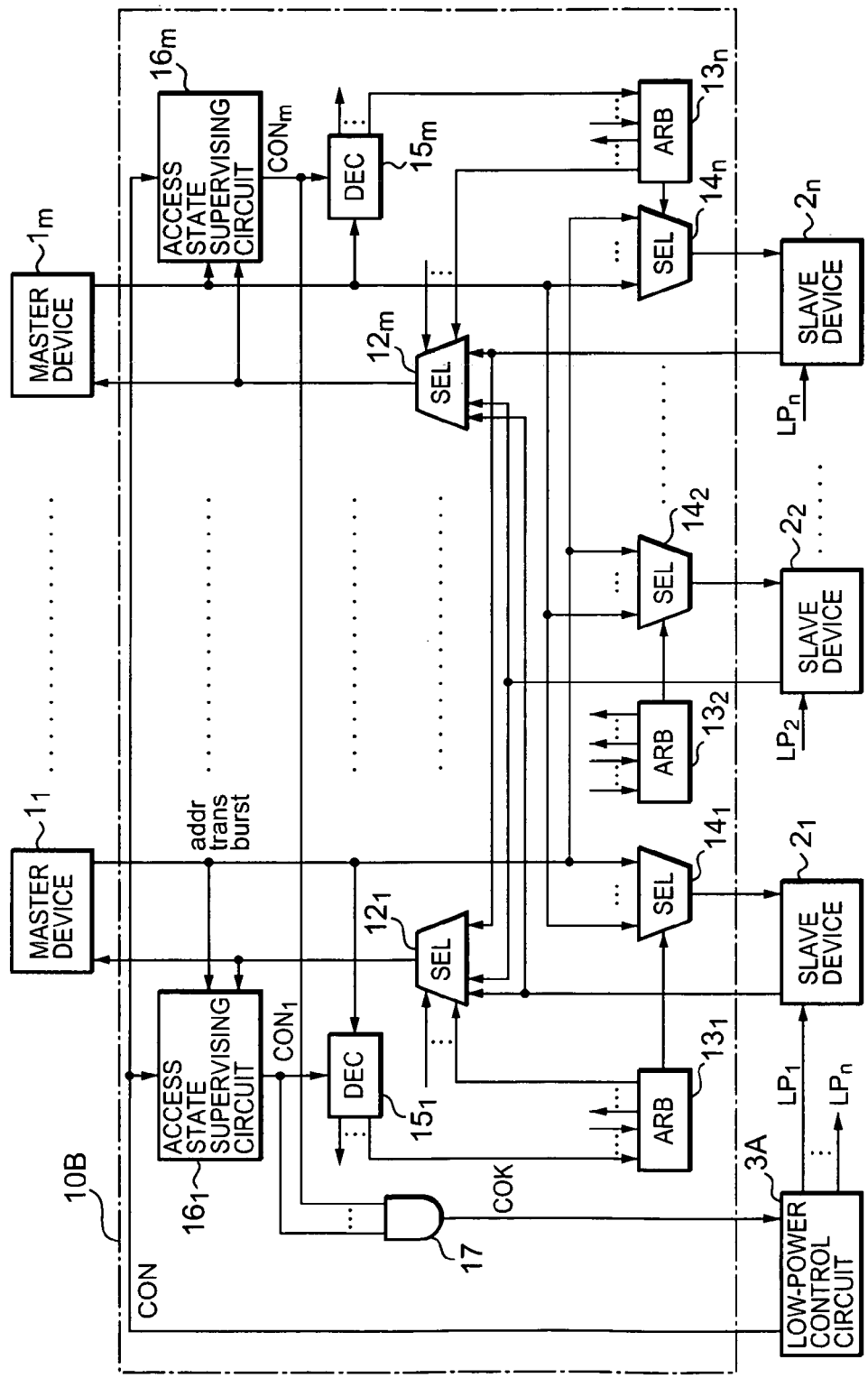
FIG. 3 is a block diagram depicting a matrix type bus connection system according to the second embodiment of the present invention.

FIG. 3 is a block diagram depicting a matrix type bus connection system according to the second embodiment of the present invention. It should be noted that similar elements in FIG. 2 and FIG. 3 are denoted with the similar reference symbols.

The matrix type bus connection system includes matrix type bus circuit 10B in place of matrix type bus circuit 10A in FIG. 2. This circuit 10B includes a plurality of access state supervising circuit $16_i$ according to each master device $1_i$ and a logical product gate circuit (refer to this circuit simply "AND" hereinafter) 17 for executing AND operation of the output signals of each circuit $16_i$. This circuit 10B also includes low-power control circuit 3A in place of low-power control circuit 3 in FIG. 2. The function of this circuit 3A is a little bit different from that of the circuit 3.

Each access state supervising circuit $16_i$ supervises access state of the associated master device $1_i$ to the slave device 2 through associated bus. In case that associated master device is not on accessing slave device, the access state supervising circuit $16_i$ outputs control signal (CONi) to associated decoder $15_i$, when receiving control signal (CON) from low-power control circuit 3A for altering decoding table contents in the decoder $15_i$. When accessing between master device and slave device is on execution, associated access state supervising circuit $16_i$ detects access termination or suspension timing and outputs control signal (CONi) to associated decoder $15_i$ at that timing.

Above-mentioned detection operation can be executed according to the data transfer protocol between master device $1_i$ and slave device $2_j$, for example, by watching response signal, in case of the operation protocol is such that outputting "H" level response signal according to data transfer termination.

The low-power control circuit 3A outputs low-power signal (LPj) to the relevant slave device $2_j$, only when control signals (CONi) of all access state supervising circuits $16_i$ are set to be "H" level and switching completion signal (COK) from the AND 17 turns to "H" level. The other operation is similar to that of the first embodiment:

The characteristic operation of this matrix type bus connection system is such that if there is a master device on accessing slave device, altering the decoding table contents in the decoder $15_i$ of master device $1_i$ is inhibited and relevant slave device is set to low-power operation state at the timing when all of the decoding table contents altering in the decoder $15_i$ is completed. The other operation of this system is similar to that of the first embodiment system.

As stated above, the matrix type bus connection system of this embodiment includes a plurality of access state supervising circuits $16_i$ for watching access state of each master device $1_i$ to each slave device 2, and altering decoding table contents in decoder $15_i$ at the timing when accessing is not in execution. This system also includes low-power control circuit 3A for setting the relevant slave device in low-power operation state after all decoding table contents altering is completed. In this way, in addition to the advantages of the first embodiment, the matrix type bus connection system of this embodiment enables setting slave device in low-power operating state safely without causing erroneous operation.

What is claimed is:

1. A matrix type bus connection system, comprising:
   a plurality of master devices for issuing connection request by outputting a target device address to each dedicated master bus;
   a plurality of slave devices for transferring data to the master device through dedicated slave bus;
   a low-power control circuit for controlling each slave device in low-power operation state;
   a plurality of decoders equipped with the plurality of master devices, respectively, such that each said decoder analyzes the address of the connection target slave device issued from the associated master device to specify the connection target slave device, and to output a connection request signal, said decoder also outputs a connection request signal to a predetermined default slave device in accordance to a control signal from the low-power control circuit, when connection request is issued from master device to the slave device in low-power operation state;
   a plurality of arbitration circuits equipped with the plurality of slave devices, respectively, such that said arbitration circuit controls connections between said master device and said slave device;
   a first selectors equipped with the plurality of master devices, respectively, such that said selector selects the bus of said slave device to connect the bus of associated master bus according to a first selection signal from the arbitration circuit; and
   a second selectors equipped with the plurality of slave device, respectively, such that said selector selects the bus of said master device to connect the bus to the associated slave bus according to a second selection signal from the arbitration circuit.

2. A matrix type bus connection system, comprising:
   a plurality of master devices for issuing connection request by outputting a target device address to each dedicated master bus;

a plurality of slave devices for transferring data to the master device through dedicated slave bus;

a low-power control circuit, before setting a plurality of slave device in low-power operation state, outputs a control signal for that preparation and controls the relevant slave device in low-power operation state after the preparation is completed, according to a completion signal from a completion detection circuit;

a plurality of access state supervising circuits equipped with the plurality of master devices, respectively, such that each said access state supervising circuit supervises an access signal from associated master device, and outputs a second control signal related to the control signal, immediately, in the case that the master device is not on accessing slave device, whereas outputs the second control signal after the access termination or suspension is done;

a completion detection circuit for outputting the completion signal to the low-power control circuit when all of the access state supervising circuits output said second control signal;

a plurality of decoders equipped with the plurality of master devices, respectively, such that each said decoder detects address from associated master device and refers to the decoding table according to the second control signal, so, specifies the target slave device to outputs a connection request signal according to the relevant address;

a plurality of arbitration circuits equipped with the plurality of slave devices, respectively, such that said arbitration circuit controls connections between said master device and said slave device;

a first selectors equipped with the plurality of master devices, respectively, such that said selector selects the bus of said slave device to connect the bus of associated master bus according to a first selection signal from the arbitration circuit; and a second selectors equipped with the plurality of slave device, respectively, such that said selector selects the bus of said master device to connect the bus to the associated slave bus according to a second selection signal from the arbitration circuit.

3. In a matrix type bus connection system, wherein it comprises a matrix type bus circuit comprising a plurality of master devices and slave devices, a connection target slave device is specified by a decoder equipped with each master device, the bus connection control is done by a plurality of arbitration circuits equipped with the plurality of slave devices to be able to transfer data between master device and slave device, a power reduction method for said system comprising:

supervising an access condition of each master device;

switching connection request for destination device from the low-power operation slave device to predetermined default slave device by altering a contents of decoding table in relevant decoder, immediately, in the case that the master device is not on accessing slave device, and after the termination of access or suspension is done, in the case that the master device is on accessing the slave device; and setting the low-power operation state target slave device to be in low-power operation state, after completion of altering the contents of the decoding table is done.

* * * * *